(12) United States Patent
Ross

(10) Patent No.: US 7,491,147 B2
(45) Date of Patent: Feb. 17, 2009

(54) TORQUE VECTORING DIFFERENTIAL APPARATUS

(75) Inventor: Craig S. Ross, Ypsilanti, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 330 days.

(21) Appl. No.: 11/416,896

(22) Filed: May 3, 2006

(65) Prior Publication Data
US 2007/0259749 A1 Nov. 8, 2007

(51) Int. Cl.
F16H 48/06 (2006.01)
(52) U.S. Cl. .................................... 475/225
(58) Field of Classification Search ............... 475/202, 475/198, 220, 222, 221, 225
See application file for complete search history.

(56) References Cited

U.S. PATENT DOCUMENTS

| | | | |
|---|---|---|---|
| 1,632,787 A * | 6/1927 | Crawford | 475/231 |
| 5,370,588 A * | 12/1994 | Sawase et al. | 475/84 |
| 5,910,064 A * | 6/1999 | Kuroki | 475/199 |
| 6,120,407 A * | 9/2000 | Mimura | 475/225 |
| 6,951,522 B2 * | 10/2005 | Baxter et al. | 475/205 |
| 7,059,991 B2 * | 6/2006 | Puiu | 475/201 |
| 7,204,778 B1 * | 4/2007 | Mimura | 475/225 |
| 7,238,140 B2 * | 7/2007 | Gradu | 475/221 |
| 7,278,947 B2 * | 10/2007 | Puiu | 475/201 |
| 7,338,404 B2 * | 3/2008 | Gassmann et al. | 475/231 |
| 2006/0172845 A1 * | 8/2006 | Gassmann et al. | 475/205 |
| 2007/0259751 A1 * | 11/2007 | Ross et al. | 475/231 |

* cited by examiner

Primary Examiner—Dirk Wright

(57) ABSTRACT

A torque vectoring differential apparatus disposed in a vehicle powertrain includes an engine, transmission, and a torque vectoring differential. The torque vectoring differential includes a bevel gear differential assembly having a carrier input and side gear outputs. The side gear outputs are controlled to distribute torque from the torque and speed from the input member to the individual side gears through two speed control mechanisms each of which is controlled by respective individually selectively engageable torque-transmitting mechanisms. The differential assembly, and the speed control mechanisms are disposed in separate housings.

8 Claims, 1 Drawing Sheet

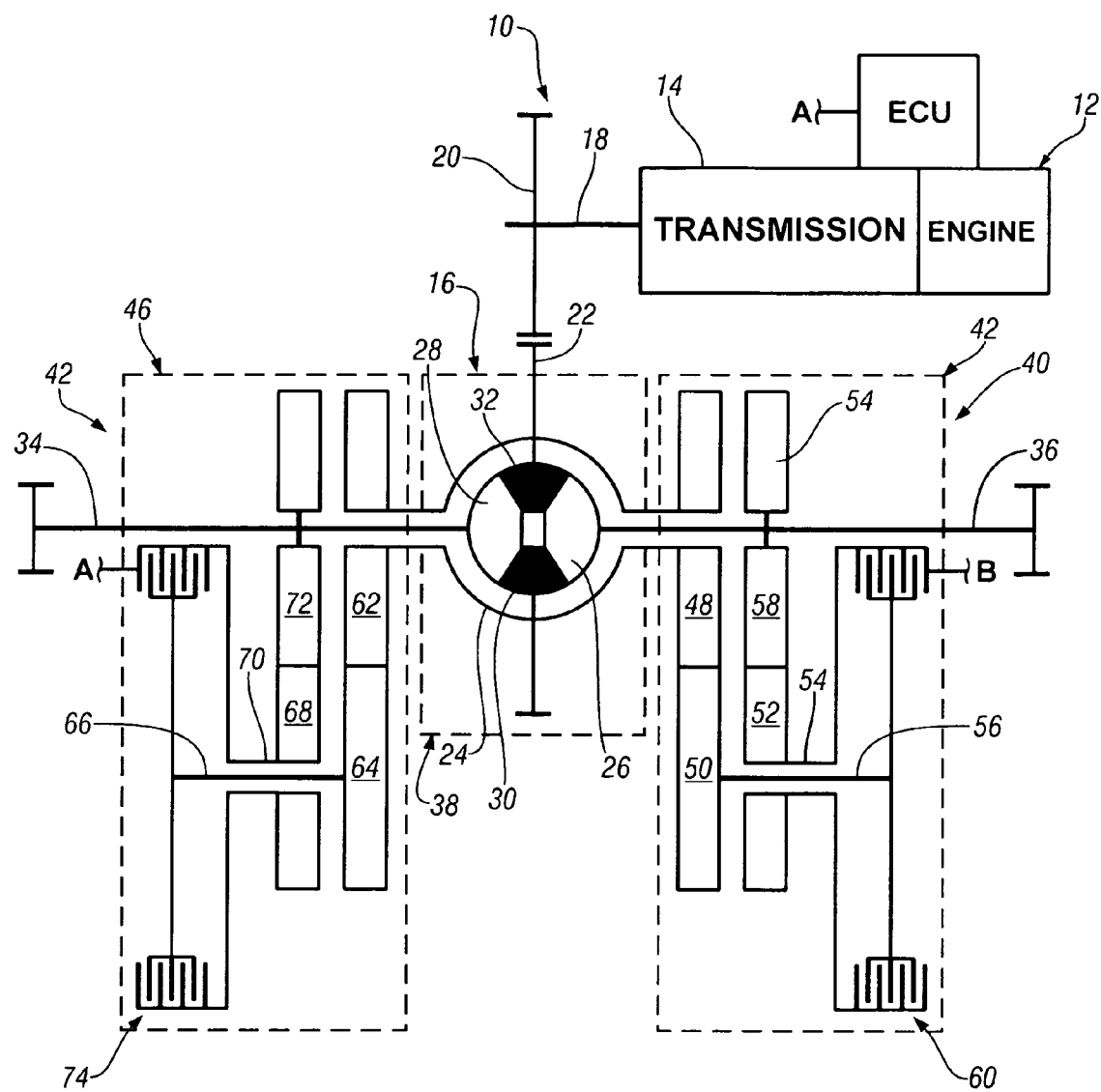

TORQUE VECTORING DIFFERENTIAL APPARATUS

TECHNICAL FIELD

This invention relates to differential apparatus in a vehicle drive train and, more particularly, to differential apparatus providing torque vectoring or output speed control.

BACKGROUND OF THE INVENTION

Vehicle powertrains incorporate an engine, transmission, and a differential drive apparatus. The differential apparatus is, as is well known, a mechanism, which has an input from the vehicle transmission and at least two output members driving the wheels of the vehicle. The vehicle differentials have taken the form of both bevel gear type units and planetary gear type apparatus. Both of these differential apparatus are well known.

The bevel gear type differential generally has a ring and pinion gear input to a carrier or casing, which revolves about the axis of the output side gears. The side gears are driven from the rotary action of the carrier through bevel gears, which are rotatably mounted within the carrier or housing assembly.

Planetary gear differentials generally incorporate a ring gear member, a sun gear member, and a planet carrier assembly member. One of the members, for example a ring gear, is an input member while the carrier and sun gear are output members, which provide drive through the vehicle wheels or other drive mechanisms. The conventional or normal differential within a vehicle drive train does not limit a speed difference, which might occur between the output members of the differential. For example, if one output wheel is on a very slippery surface and the other on a good friction surface, the vehicle wheel on the slippery surface will spin at a high rate of speed while the other wheel is stationary, thus creating a high differential speed across the differential apparatus. This condition, when warranted, is prevented by an apparatus known as a limited slip differential. In such mechanisms, the differential assembly has disposed therein an automatically actuated clutch mechanism, which prevents the rotational difference between the output members and therefore provides a driving force to the wheel on the better drive surface.

SUMMARY OF THE INVENTION

It is an object of this invention to provide an improved torque vectoring differential apparatus.

In one aspect of the present invention, a vehicle drive train including at least a transmission differential and drive wheels includes an output speed control mechanism for the differential.

It is another aspect of the present invention to provide a torque vectoring differential apparatus wherein speed control mechanisms are provided on both sides of a differential thereby controlling both outputs.

It is yet another object of the present invention to provide a torque vectoring differential apparatus having speed control mechanisms on the output sides of the differential wherein the output speeds adjusted relative to each other.

It is still another object the present invention to provide a torque vectoring differential apparatus wherein the output speed of the differential apparatus is controlled at a speed ratio relative to the input mechanism of the differential.

DESCRIPTION OF THE DRAWING

FIG. 1 is a diagrammatic and schematic representation of an embodiment of the present invention.

DESCRIPTION OF THE EXEMPLARY EMBODIMENT

A powertrain 10 includes an engine 12, a transmission 14, and a torque vectoring differential apparatus generally designated 16. The engine 12 and transmission 14 are conventional power mechanisms well known in the art. The transmission 14 is preferably a multi-speed automatic shifting planetary type transmission, which includes an electro-mechanical control (ECM) to control the ratio mechanisms within the transmission in a well known manner. The ECM, as is well known, receives a multitude of signals from the vehicle including engine speed, transmission output speed, transmission ratio selection, vehicle output speed, and can incorporate a steering control or steering demand signal. However, the invention will perform equally well with a countershaft type transmission having an appropriate control system.

The transmission 14 has an output shaft 18, which is drivingly connected through gear mechanisms 20 and 22 with a case or carrier member 24 of the torque vectoring differential apparatus 16. Also included in the torque vectoring differential apparatus 16 is a pair of side gears 26 and 28, which are operatively connected with the carrier 24 to gear members 30 and 32. The differential represented by the carrier 24 and side gears 26 and 28 operate in a well known manner and that when the carrier 24 is rotated by the gear 22, the gears 26 and 28 will also rotate about respective axes represented by output shafts 34 and 36. It is also well known that the axle of these shafts 34 and 36 are operatively connected to drive vehicle wheels, not shown. If one of the wheels is on a slippery or low traction surface, the other wheel will remain stationary while the tractionless wheel will rotate at a high rate of speed. This is not a desirable operating feature but it does occur when a vehicle is stuck in mud, snow or on ice.

To prevent this occurrence, some vehicles have incorporated what is termed a limited slip differential wherein a clutch mechanism is included within the differential housing to provide for speed control between the carrier or the differential in at least one of the side gears. The present invention provides for the conventional differential to be disposed in a housing 38 and two torque vectoring or speed control mechanisms 40 and 42 to be disposed within housings 44 and 46, which are separate from the housing 38. This permits the speed control mechanisms 40 and 42 to be changed depending upon the particular vehicle in which they are to be used. If it is desirable to reduce the mass and space of the assembly, the housings 38, 44, and 46 can be integral The speed control mechanism 40 includes a drive gear 48, a transfer gear 50 meshingly engaged therewith, a transfer gear 52 is secured to a sleeve shaft 54 surrounding a shaft 56. The shaft 56 is drivingly connected with the gear 50. The speed control mechanism 40 also includes a driven gear 58 which meshes with the gear 52. The gear 58 is drivingly connected with the shaft 36 and therefore with the side gear 26. The shafts 56 and 54 are operatively connected on opposite sides of a torque-transmitting mechanism 60, which can be in the form of a conventional fluid-operated friction clutch. The torque-transmitting mechanism 60 is controlled in engagement by the ECM.

The speed control mechanism 42 includes a drive gear 62, a transfer gear 64, which is secured to a rotatable shaft 66, a transfer gear 68 secured to a sleeve shaft 70 rotatably supported on the shaft 66, and a driven gear 72, which is drivingly connected with the shaft 34 and therefore the side gear 28. The shafts 66 and 70 are operatively connected with opposite sides of a torque-transmitting mechanism 74, which may be a conventional fluid-operated clutch controlled by the ECM.

A gear train, comprised of gears 48, 50, 52, and 58, and torque-transmitting mechanism 60 control the speed ratio, increase or decrease, between the differential carrier 24 and the output shaft 36 depending on engagement condition of the torque-transmitting mechanism 60. A gear train, comprised of gears 62, 64, 68 and 72, and the torque-transmitting mechanism 74 provide a speed increase in ratio between the differential carrier 24 and the shaft 34 and therefore side gear 28.

The speed control mechanisms 40 and 42 provide for torque vectoring of the differential apparatus. That is, the engagement of one of the clutches, for example 60, provides for a speed control between the carrier 24 and the shaft 36 and, of course, side gear 26. When the vehicle is cornering and it is desirable to provide for the output wheel connected with the shaft 36 to rotate faster than the shaft 34, the clutch 60 is engaged in a controlled manner to provide for the speed differential required. As is well known with speed differentials, the output shafts 34 and 36 will be driven by the differential carrier 24. If the shaft 36 is rotated faster than the carrier 24, the shaft 34 will automatically rotate slower than the carrier 24 through the side gears 26, 28.

If it is desirable to have the shaft 34 and therefore the vehicle wheel attached thereto rotate more rapidly than the shaft 36, the clutch 74 is engaged in a controlled manner such that the gear train 62, 64, 68, and 72 provide for an increased speed between the carrier 24 and the output shaft 34. As described above, an increase in speed at the shaft 34 will be met with a decrease in speed of the shaft 36. Also as described above, the torque vectoring differential apparatus 16 will therefore provide for speed differentials or torque distribution necessary to provide for improved cornering or turning ability of the vehicle on which it is disposed.

By containing the speed control mechanisms or torque vectoring mechanisms 40 and 42 in separate housings, the entire assembly of these mechanisms can be readily changed to provide the best operation for a particular vehicle. Also, the gear 48, 50, 52, 58, 62, 64, 68, and 72 are shown as spur gears or helical gears in which the idlers or transfer gears are on opposite axes, however, a planetary gearset could be employed and those familiar with the art will be well aware of the fact that there are many types of speed change gearings which can be employed to provide the desired effect between the carrier 24 and the shafts 34 and 36.

By placing the differential carrier in the housing 38 and the torque vectoring mechanisms 40 and 42 in housings 44 and 46 respectively, any replacement of or change in the gear ratios can be accomplished with a minimum of disassembly.

The invention claimed is:

1. A torque vectoring differential apparatus comprising:
   a differential mechanism having a carrier member, an input member and first and second output members disposed within a housing;
   a first speed control mechanism disposed within a second housing comprising a first drive gear rotatably connected to the carrier member, a first transfer gear intermeshed with the first drive gear, a first driven gear rotatably connected to the first output member, a second transfer gear intermeshed with the first driven gear, and a first selectively engageable torque-transmitting mechanism to selectively connect the first and second transfer gears to provide a speed differential between the input of the differential mechanism and said first output member; and
   a second speed control mechanism disposed within a third housing comprised of a second drive gear rotatably connected to the carrier member, a third transfer gear intermeshed with the second drive gear, a second driven gear rotatably connected to the second output member, a fourth transfer gear intermeshed with the second driven gear, and a second selectively engageable torque-transmitting mechanism to selectively connect the third and fourth transfer gears to provide a controlled speed differential between the differential input second output member.

2. The torque vectoring differential apparatus defined in claim 1 wherein:
   the first drive, first driven, first transfer and second transfer gears of said first speed control mechanism provide a controlled speed relationship between said input member and said first output member upon the selective engagement of said first torque-transmitting mechanism.

3. The torque vectoring differential apparatus defined in claim 1 wherein:
   the second drive, second driven, third transfer and fourth transfer gears of said second speed control mechanism provide a controlled relationship between said input member and said second output member upon selective engagement of said second torque-transmitting mechanism.

4. The torque vectoring differential apparatus defined in claim 1 wherein:
   two of said gears of each of said first and second speed control mechanisms are disposed for rotation about an axis defined by said input member.

5. The torque vectoring differential apparatus defined in claim 1 wherein:
   said differential mechanism is disposed in a first housing, said first speed control mechanism is disposed in a second housing, and said second speed control mechanism is disposed in a third housing.

6. The torque vectoring differential apparatus defined in claim 1 wherein:
   the gears of the first speed control mechanism are configured to provide a speed ratio between the carrier member and the first output member.

7. The torque vectoring differential apparatus defined in claim 1 wherein:
   the gears of the second speed control mechanism are configured to provide a speed ratio between the carrier member and the second output member.

8. The torque vectoring differential apparatus defined in claim 5 further wherein:
   the second and third housings are external of the first housing.

* * * * *